(12) United States Patent
Chapman et al.

(10) Patent No.: US 7,245,103 B2
(45) Date of Patent: Jul. 17, 2007

(54) MOTOR SPEED AND POSITION CONTROL

(75) Inventors: Danny Keith Chapman, Nicholasville, KY (US); Steven Michael Turney, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 764 days.

(21) Appl. No.: 10/378,430

(22) Filed: Mar. 3, 2003

(65) Prior Publication Data

US 2004/0174126 A1    Sep. 9, 2004

(51) Int. Cl.
*G05D 13/00* (2006.01)
(52) U.S. Cl. .................. 318/651; 318/635; 318/687
(58) Field of Classification Search .................. None
See application file for complete search history.

(56) References Cited

U.S. PATENT DOCUMENTS

| | | | |
|---|---|---|---|
| 4,153,863 A | 5/1979 | Schachte et al. | |
| 4,415,844 A | 11/1983 | Mendenhall et al. | |
| 4,522,517 A * | 6/1985 | Wade et al. | 400/322 |
| 4,623,827 A | 11/1986 | Ito | |
| 4,638,225 A | 1/1987 | Morinaga et al. | |
| 4,689,540 A | 8/1987 | Tani et al. | |
| 4,885,575 A | 12/1989 | Williams | |
| 5,089,761 A | 2/1992 | Nakazawa | |
| 5,444,345 A | 8/1995 | Jinnai | |
| 5,532,583 A * | 7/1996 | Davis et al. | 324/202 |
| 5,625,264 A | 4/1997 | Yoon | |
| 5,737,483 A | 4/1998 | Inaji et al. | |
| 6,043,622 A | 3/2000 | Shiomi et al. | |
| 6,438,321 B1 | 8/2002 | Lin | |
| 6,505,127 B1 | 1/2003 | Togami | |
| 6,591,200 B1 * | 7/2003 | Cohen et al. | 702/38 |
| 6,736,475 B2 * | 5/2004 | Youngberg et al. | 347/2 |
| 2002/0050939 A1 * | 5/2002 | Yu | 341/155 |
| 2002/0172510 A1 | 11/2002 | Kobayashi et al. | |
| 2004/0252142 A1 * | 12/2004 | Struk et al. | 347/2 |

* cited by examiner

*Primary Examiner*—Marlon Fletcher
(74) *Attorney, Agent, or Firm*—Coats & Bennett, PLLC

(57) ABSTRACT

A method of controlling the speed and position of a motor includes receiving a pulse train indicative of the speed of the motor, and a periodic signal at a frequency greater than the pulse train. The number of cycles of the periodic signal per cycle of the pulse train is counted, and compared to a predetermined number. The speed of the motor is adjusted to match the count to the predetermined number, thus effecting speed control. A command position signal defining a plurality of sampling points is generated. The number of cycles of the periodic signal between a sampling point of the command position signal and an operative edge of the pulse train is counted and compared to a predetermined number. The speed of the motor is further adjusted to match the count to the predetermined number, thus effecting position control.

18 Claims, 8 Drawing Sheets

MOTOR CONTROL SYSTEM

MOTOR SPEED AND POSITION CONTROL

BACKGROUND OF THE INVENTION

The present invention relates generally to the field of motor control and specifically to a method of accurate speed and position control.

Precise motor speed control is a requirement of a broad array of motor-driven applications. Mirror motors in laser print heads, disk drives, and CD-ROM drives are examples of precise motor speed control. Another example where speed control is critical is a motor driving a print media through an electrophotographic (EP) printer—in particular, a color EP printer—and/or driving the PC drum(s) of such a printer. The position of dot placement on the PC drum(s), and on the print media as it is transported past the drum(s), is directly influenced by the speed of the driving motor. Any perturbations in the speed of the drive motor will be manifest as misregistration of dots on the print media. This misregistration is particularly noticeable in color EP printers, where different colors of toner are deposited in layers on the print media. To avoid misregistration, the position of dot placement must be tightly controlled, requiring control of the motor speed to a tolerance of 0.01%. DC motors, and in particular, brushless DC motors are typically used in such applications. These motors are well suited to the speed and position control method of the present invention, although the invention is not so limited, and is applicable to AC motors as well.

Traditional motor speed control is accomplished with a Phase-Lock Loop (PLL) controller. PLL controllers are well known in the electronics and communications arts, where they are commonly used for the synthesis and regulation of high frequency oscillating electrical signals. PLL controllers generally synchronize two signals in frequency by eliminating phase errors between the two. Application of PLL controllers to motor control systems typically comprises generating a periodic signal representative of motor speed—such as from an encoder—and comparing the signal to a reference signal of a desired frequency. The PLL controller attempts to match the phase, and hence frequency, of the two signals in a single control loop. Based on the phase error signal from the PLL controller, the voltage to the motor is increased or decreased to increase or retard its speed, so as to match the reference frequency signal.

Unlike oscillating electrical signals, motors contain inertia. They do not respond instantaneously to changes in commanded signals. Because of this, PLL-based motor controllers, while adequate for the speed control motor systems described above, which are characterized by a constant and predictable load, do not compensate well for fluctuations in mechanical load, such as commonly found in EP printers. Torque fluctuations in EP printers arise due to paper picking, nip shock, toner stirring, and a variety of other causes.

Additionally, traditional PLL controllers are constructed using analog circuits, which include many non-linear components. While many PLL controllers have been implemented partially in digital circuits, most real-world controls remain a hybrid mix of digital and analog components, and retain some non-linearity. Furthermore, most PLL controllers are "tuned" for a specific range of frequencies, outside of which the control seriously degrades. Even within the designed frequency range, however, due to the control of both frequency and phase in a single loop, with PLL controllers it is important to know which error—phase or frequency—dominates, as controlling to the wrong error may cause the motor speed to lock onto harmonics of a commanded speed rather than the actual commanded speed.

SUMMARY OF THE INVENTION

The present invention relates to a method of controlling the speed and position of a motor. The method includes receiving a pulse train indicative of the speed of the motor, and a periodic signal at a frequency greater than the pulse train. The number of cycles of the periodic signal per cycle of the pulse train is counted, and compared to a predetermined number. The speed of the motor is adjusted to match the count to the predetermined number, thus effecting speed control.

The method further comprises generating a command position signal defining a plurality of sampling points. The number of cycles of the periodic signal between a sampling point of the command position signal and an operative edge of the pulse train is counted and compared to a predetermined number. The speed of the motor is further adjusted to match this count to the predetermined number, thus effecting position control.

Both the speed and position control loops may include proportional, integral, derivative (PID) controllers.

DETAILED DESCRIPTION OF THE INVENTION

Figure 1:
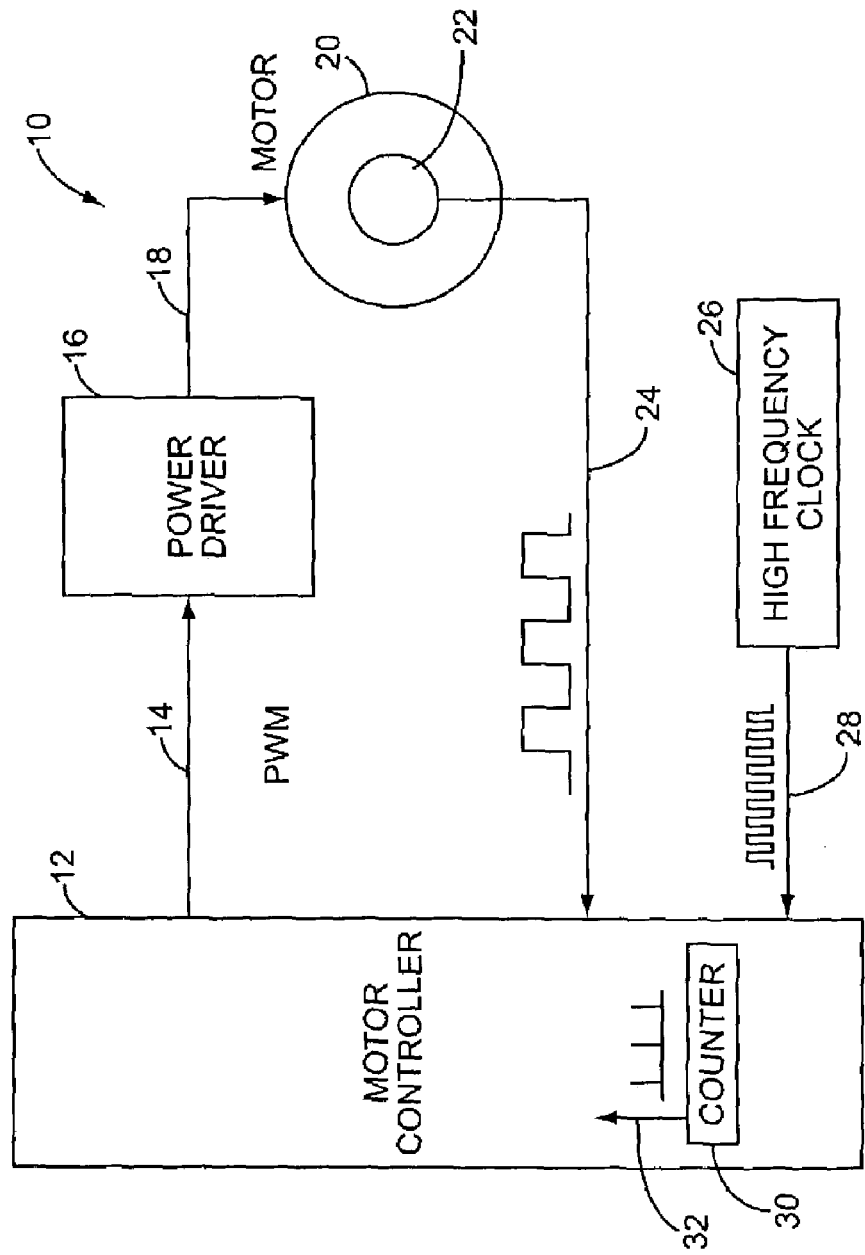
FIG. 1 is a block diagram of a motor control system.

The present invention relates to a control system for a motor, wherein both the motor's speed and shaft position are precisely controlled. FIG. 1 depicts a high-level representation of the motor control system, designated generally at 10. The motor control system 10 includes a motor controller 12 that generates Pulse Width Modulation (PWM) data 14. A power driver 16 converts the PWM data to power signals 18 that are applied to the motor 20, as well known in the art. Operatively coupled to the motor 20 is a shaft position encoder 22 that generates a pulse train 24 indicative of the speed and incremental position of the motor 20. A high frequency clock 26 generates a high frequency periodic signal 28 that is applied to the motor controller 12. The motor controller 12 includes a counter 30 that generates a command position signal 32, comprising a plurality of precisely temporally spaced pulses, or sampling points. The motor control system 10 of FIG. 1 is a functional representation; in a given implementation, the motor controller 12, the high frequency clock 26, the counter 30, and possibly the power driver 16 may be combined, such as in an ASIC, FPGA, or the like, as well known in the art.

The encoder 22 need not necessarily be coupled to the shaft of the motor 20. The encoder 22 may be placed elsewhere within the drive train driven by the motor 22, such as for example, on a gear or other roller. The encoder 22 may be of a variety of designs as known in the art, such as optical, magnetic, or the like, and may generate a digital or analog output. The encoder 22 preferably provides a very accurate feedback signal indicative of the incremental position of the shaft of the motor 20. For example, in a preferred embodiment, the encoder produces a single pulse every 7.2 degrees of rotation. The pulse train output 24 is used by the controller 12 to calculate speed and position errors of the motor shaft as compared to a desired shaft motion.

As described more fully herein, the speed and position of the motor 20 are determined from the pulse train 24 by use of a high frequency periodic signal 28 generated by a high-frequency clock 26. As a functional lower limit on the frequency of the periodic signal 28, it must satisfy the Nyquist criteria, i.e., that it is at least twice the frequency of the highest frequency component of the pulse train 24. The periodic signal 28 is preferably an order of magnitude or more faster than the pulse train 24, and is most preferably several orders of magnitude faster. For example, in one embodiment, the periodic signal 28 has a frequency of 12 MHz, and the pulse train 24 has a frequency of 2 KHz.

The motor controller 12 determines the speed of the motor 20 by counting the number of cycles of the high frequency periodic signal 28 that occur per cycle of the pulse train 24. For example, on each rising edge of the pulse train 24, the controller 12 may count the number of cycles, or "ticks," of the periodic signal 28 that have occurred since the previous rising edge of the pulse train 24. This provides an indication of the rotor speed of the motor 20. That is, the more periodic signal 28 ticks that are counted during one cycle of the pulse train 24, the slower the motor is turning. Conversely, the fewer periodic signal 28 ticks that are counted per cycle of the pulse train 24, the faster the motor 20 is turning. By comparing the actual number of periodic signal 28 ticks counted during a cycle of the pulse train 24 to a predetermined, desired number to be counted, a speed error may be computed. In other words, the rising edges of the pulse train 24 may be used as a sampling signal, indicating when the motor controller 12 is to sample and count elapsed cycles of the periodic signal 28. As the frequency signal of the periodic signal 28 is known and highly precise, the speed of the motor 20 may be determined. The same calculation may be performed, of course, utilizing the falling edges of the pulse train 24. Additionally, to limit the sample rate, every other edge, every third edge, or the like, may be utilized as sample signals in lieu of every edge.

Figure 3:
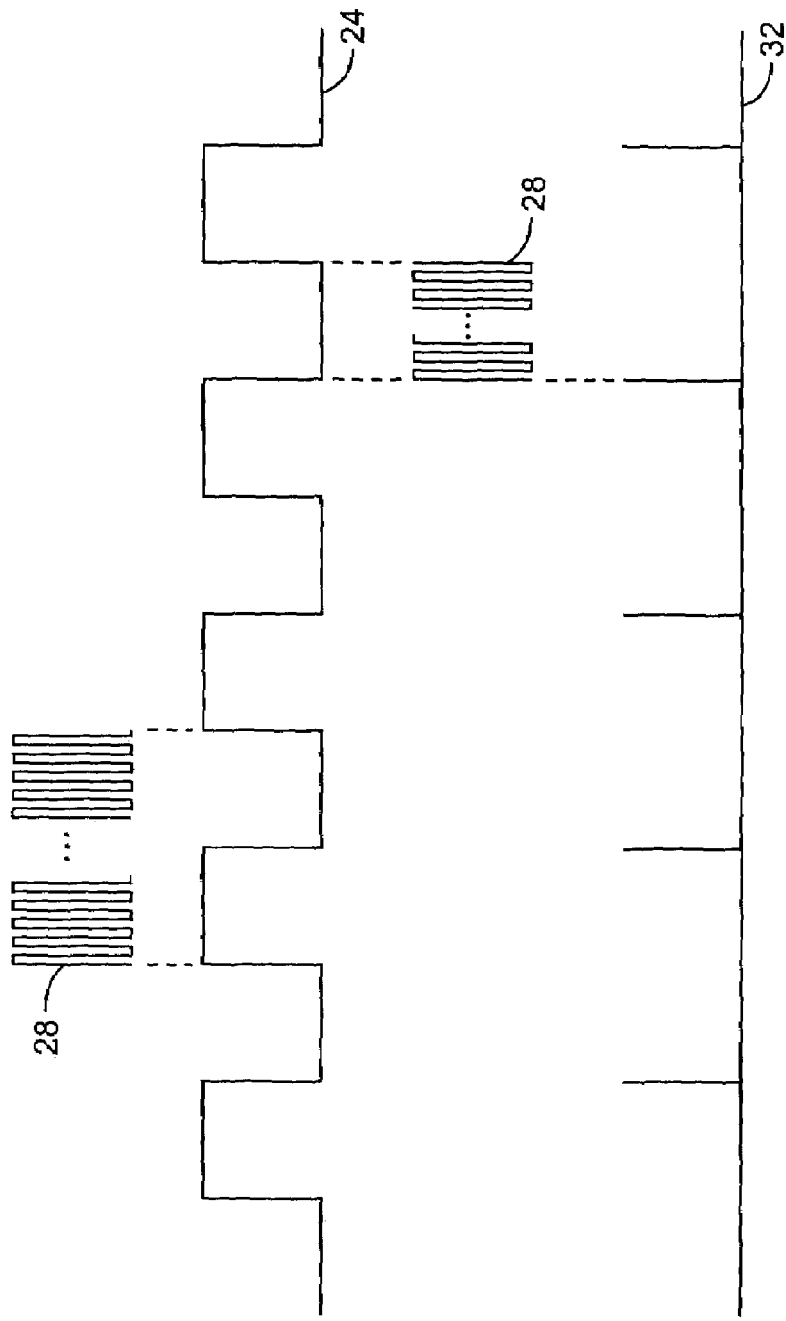
FIG. 3 depicts various waveforms of the motor control system.

FIG. 3 depicts the measure of motor 20 speed utilizing this technique. Using one cycle of the pulse train 24, and sampling on the rising edges, the number of cycles, or ticks, of the high-frequency periodic signal 28 are counted. This number may be converted to an indication of the speed of the motor 20, and by comparison to a predetermined desired number of ticks per cycle, the PWM data 14 output by the motor controller 12 may be adjusted to advance or retard the speed of the motor 20, as required to bring the two counts into agreement.

Figure 2:
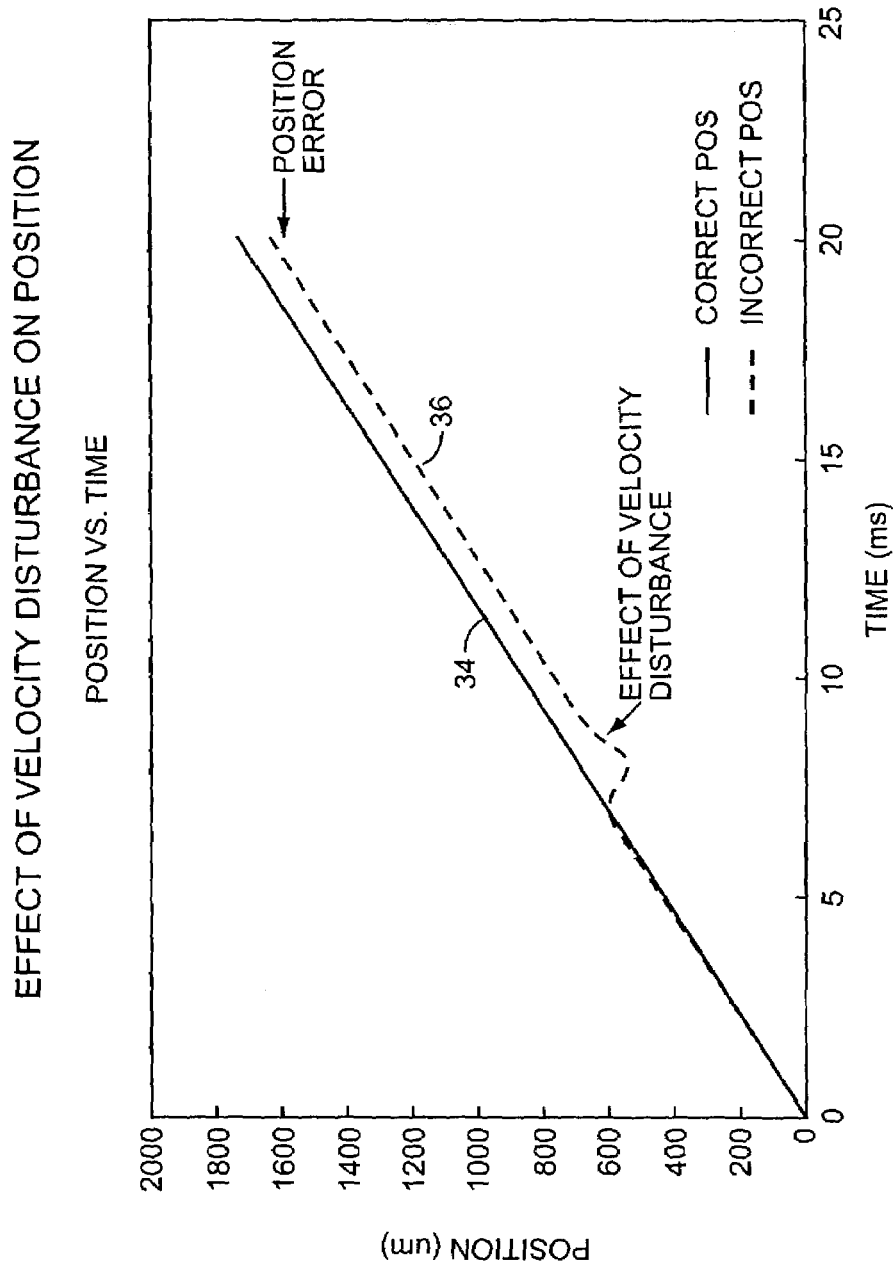
FIG. 2 is a graph depicting the effects of speed disturbance on position.

Where, as in a color printer, the motor 20 drives an object, such as print media, at a constant speed, the position of the object may be plotted vs. time by counting the ticks per encoder pulse train cycle, if the relationship between the linear motion of the object and the angular motion of the motor shaft is known. FIG. 2 depicts a plot of such position versus time, in the case of 5.575 microns/degree. Curve 34 depicts the desired relationship between position and time, i.e., the slope of curve 34 is linear and represents the desired constant speed of the motor 20. The curve 36 represents a condition wherein the motor 20 is initially maintained at the desired constant speed (that is, its position versus time plot follows the ideal curve 34). However, the speed of the motor 20 is temporarily disturbed for some reason, such as a momentary change in the torque experienced by the motor 20. The speed control system described above will quickly "slave" the motor 20 to the desired speed, as depicted by the linear character of curve 36, with a slope identical to the slope of the desired curve 34. However, the speed disturbance introduced a position error, as depicted by the offset of curve 36 from the desired curve 34. This position error, if uncorrected, may result in erroneous operation, such as for example, the misregistration of color pixels on the print media in a multi-color printer.

The present invention precisely controls the position of the motor 20, in addition to its speed. While speed is controlled by ensuring that the pulse train 24 pulses transition at a constant, predetermined rate, position is controlled by forcing the pulses to transition at specific, predetermined points in time. The counter 30, under the control of the motor controller 12, generates a command position signal 32 comprising a series of precisely temporally spaced impulses, or sampling points. Each time the sampling signal 32 triggers, the motor controller 12 counts the number of cycles, or ticks, of the high-frequency periodic signal 28 that occur between the beginning of the sample and a rising edge of the pulse train 24. This count is compared to a predetermined value, and the speed of the motor 20 is adjusted to force the count and the predetermined value to coincide from sample to sample, thus ensuring a constant position rate of change. The position count is depicted in FIG. 3, wherein the number of ticks of the high-frequency periodic signal 28 between a sample point of the command position signal 32 and a rising edge of the pulse train 24 is counted. Of course, the negative edge of the pulse train 24 could be used in lieu of the positive edge. As depicted, the time between the sample trigger of the command position signal 32 and the operative edge of the pulse train 24 is preferably set to half of the period of the pulse train 24 at the desired speed. This provides for the maximum operating window for the position controller.

The motor controller 12 of the present invention thus establishes a dominant control loop (the coarse control loop) to effect speed control. The purpose of the speed control loop is to ensure that the speed of the motor 20 is correct, i.e., that the slope of the position versus time plot is constant. The motor controller 12 additionally implements a secondary control loop (the fine control loop) to effect position control. The purpose of the position adjustment loop is to remove position errors, which manifest themselves as shifts in the position vs. time curve, and additionally to help with transient errors. The position adjustment loop removes position errors by commanding small motor speed adjustments in the speed control loop. In a preferred embodiment, both the speed control loop and the position adjustment loop include a Proportional, Integral, Derivative (PID) controller. PID controllers are well known in the control system arts.

Figure 4:
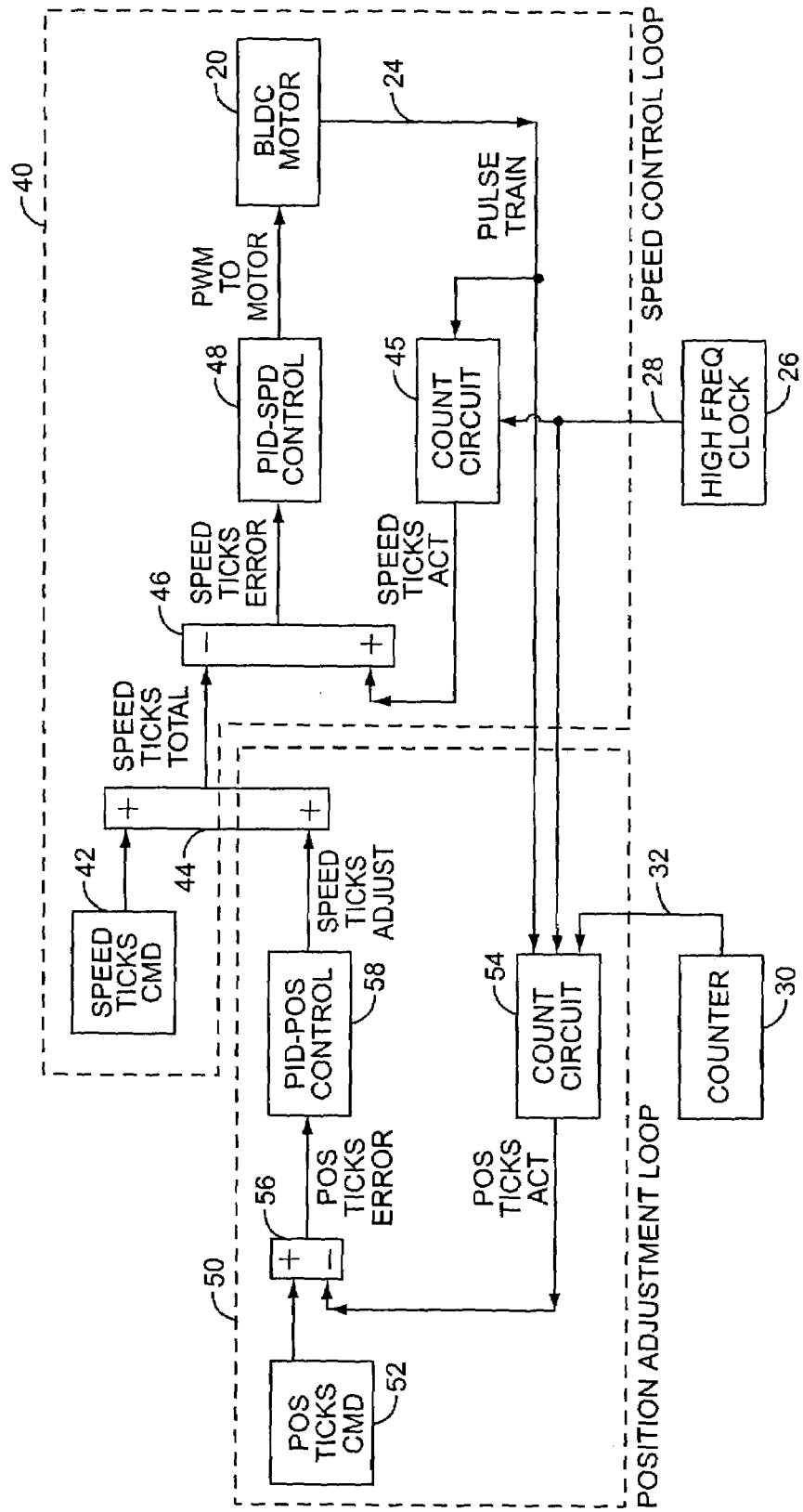
FIG. 4 is a functional block diagram showing two control loops.

FIG. 4 depicts a functional block diagram showing the elements of the speed control loop 40 and the position adjustment loop 50. Considering first the speed control loop 40, Speed_Ticks_Cmd 42 is a predetermined count of ticks, or cycles, of the high frequency periodic signal 28, representing the desired duration of a cycle of the pulse train 24 at the desired speed. Speed_Ticks_Cmd is adjusted at block 44 by the output of the position adjustment loop 50, described below, to generate Speed_Ticks_Total, the total desired count. Speed_Ticks_Actual, the actual count of cycles of the high frequency periodic signal 28 per cycle of the pulse train 24, is compared to Speed_Ticks_Total at block 46. The difference, Speed_Ticks_Error, is an input to the speed control loop PID controller 48. PID controller 48 generates the PWM data 14 to drive the motor 20 to an adjusted speed. The speed control loop 40 operates to eliminate the term Speed_Ticks_Error, thus slaving the motor 20 to the desired constant speed. For example, if Speed_Ticks_Actual exceeds Speed_Ticks_Total, indicating that an excessive number of ticks were counted during a cycle of the pulse train 24, the motor 20 is running at a lower speed than desired. Speed_Ticks_Error in this case will be a positive number, that will cause the PID controller 48 to speed up the motor 20, reducing the Speed_Ticks_Actual count, until Speed_Ticks_Actual equals Speed_Ticks_Total, and Speed_Ticks_Error is zero. Conversely, if Speed_Ticks_Actual is less than Speed_Ticks_Total, the motor is running faster than desired, Speed_Ticks_Error will be negative, and the PID controller 48 will retard the motor, increasing the Speed_Ticks_Actual count.

Now considering the position adjustment loop 50, Pos_Ticks_Cmd 52 is a predetermined count of ticks of the high frequency periodic signal 28, representing the desired duration, or position offset, between a sample trigger of the command position signal 32 and an operative edge of the pulse train 24 at the desired speed. In a preferred embodiment, Pos_Ticks_Cmd 52 is half the value of Speed_Ticks_Cmd 42, the desired number of ticks per cycle of pulse train 24, to maximize the position adjustment window. The actual number of position ticks counted, Pos_Ticks_Act, is determined at counting circuit 54 by counting ticks of the high frequency periodic signal 28 between operative edges of the position command signal 32 and the pulse train 24. Pos_Ticks_Act is compared to Pos_Ticks_Cmd 52 at block 56, and the difference, Pos_Ticks_Error, is the input to the position adjustment loop PID controller 58. PID controller 58 generates a Speed_Ticks_Adjust value that is passed to the speed control loop 40, where it modifies the Speed_Ticks_Cmd value 42, to generate Speed_Ticks_Total. In this manner, the position adjustment loop 50 modifies the speed of the motor 20 to advance or retard the motor's position, to eliminate the term Pos_Ticks_Error. In this manner, the position adjustment loop 50 forces the motor 20 to maintain the proper position as well as speed. This position control is critical in many applications, such as color printing, where a position error would show up as misregistration of the various color layers of an image on the print media.

Both the speed control loop 40 and the position adjustment loop 50 preferably include PID controllers. As well known in the control system arts, the parameters of PID controllers may be adjusted to vary the bandwidth and transient response of the system. The preferred control equations for the PID controllers are presented below, and depicted as a functional block diagram in FIG. 5. In these equations, k denotes the present sampling value, and k−1 denotes the previous sampling value. $K_p$, $K_i$ and $K_d$ are the proportional, integral, and derivative gains, respectively. These gain factors may be determined empirically or analytically by various methods known in the art.

$$Int\_Output = K_i \times Error_k + Int\_Value,$$

where $$Int\_Value = \sum_{n=1}^{k-1} K_i \times Error_n;$$

$$Deriv\_Output = K_d \times Error_k - Deriv\_Value,$$

where $Deriv\_Value = K_d \times Error_{k-1}$; and $$Output_k = K_p \times Error_k + Int\_Output + Deriv\_Output;$$

In these equations, the term Error is, for the speed control loop PID controller 48, the value Speed_Ticks_Error, output by block 46 (FIG. 4). For the position adjustment loop PID controller 58, Error is the value Pos_Ticks_Error, output by block 56. For the speed control loop PID controller 48, the value Output is the PWM data 14 (FIG. 1). For the position adjustment loop PID controller 58, Output is the value Speed_Ticks_Adjust, which is an input to the speed control loop 40, where it adjusts the value Speed_Ticks_Cmd at block 44 (FIG. 4) to generate Speed_Ticks_Total.

Figure 5:
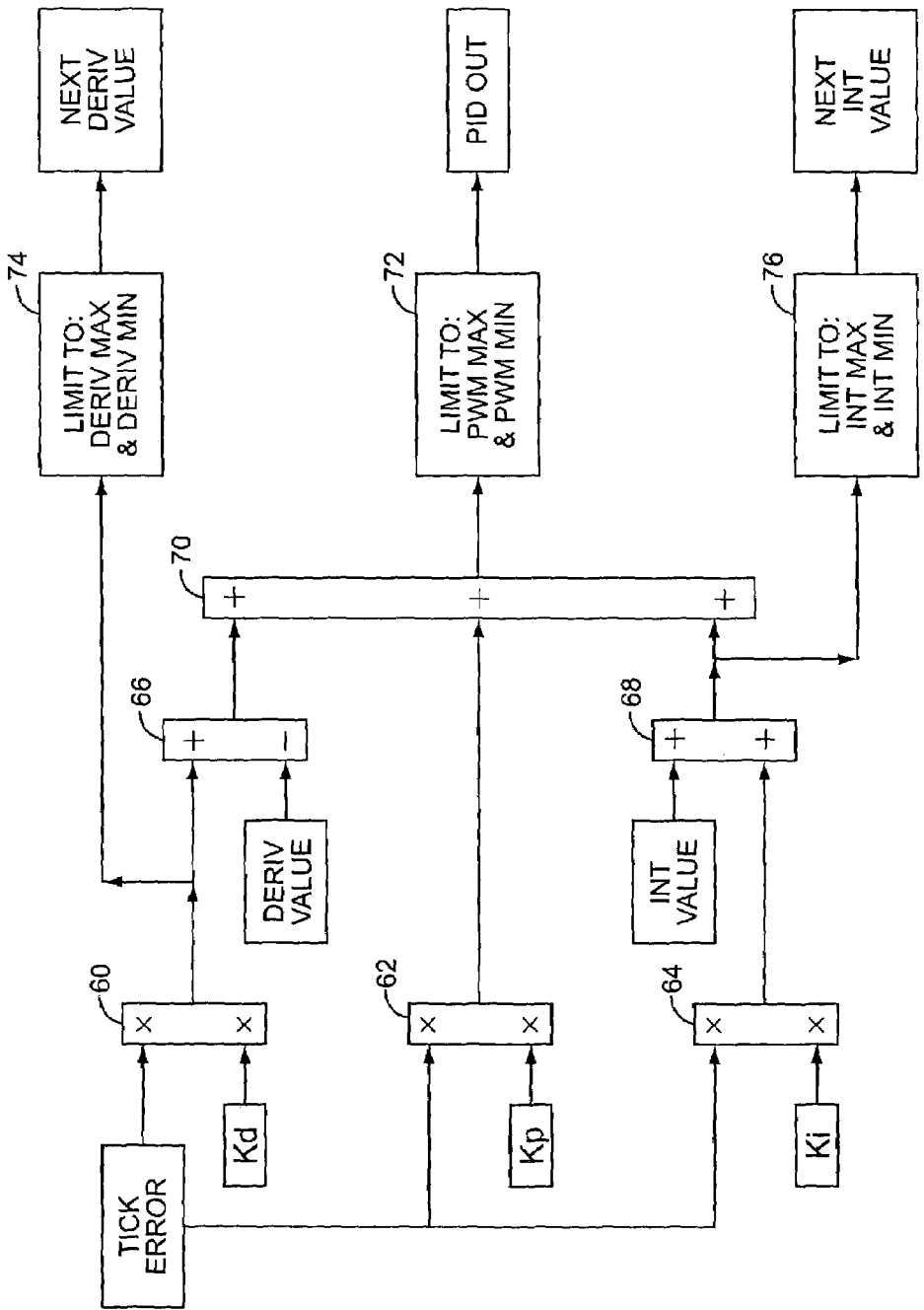
FIG. 5 is a functional block diagram depicting PID control equations.

These equations are depicted as a functional block diagram in FIG. 5. The relevant tick error—Speed_Ticks_Error or Pos_Ticks_Error—is multiplied by the three PID gains at multipliers 60, 62 and 64. The Deriv_Value is subtracted from the derivative gain product Error×$K_d$ at block 66. The Int_Value is added to the integral gain product Error×$K_i$ at block 68. These sums are then added to the proportional gain product Error×$K_p$ at block 70 to generate an unlimited output. The unlimited output—PWM data 14 for the speed control loop and Speed_Ticks_Adjust for the position adjustment loop—may be limited to minimum and maximum values at block 72. Such limiting may improve transient response, and protect the motor 20 from excessive transient command values. Similarly, to better tune the performance of the control loops 40, 50, the values of Deriv_Output and Int_Output may be limited to minimum and maximum acceptable values at blocks 74 and 76, respectively.

Figure 6:
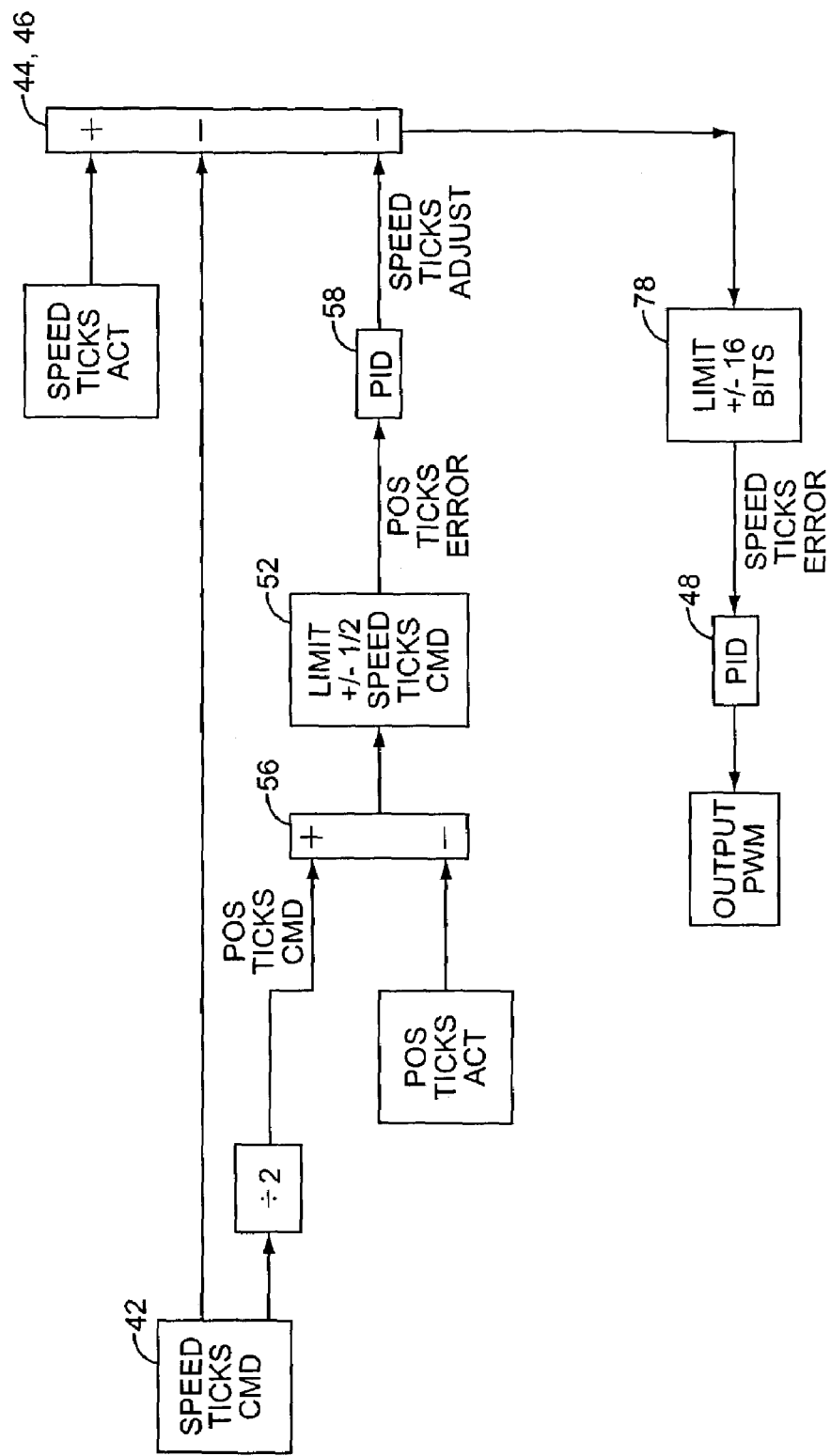
FIG. 6 is a functional block diagram depicting total controller equations.

FIG. 6 depicts a functional block diagram of the total motor control system of the present invention, with the speed control loop 40 and the position adjustment loop 50 integrated. In FIG. 6, the summing blocks 44 and 46 of FIG. 4 have been combined for clarity, and various optional but preferred limiting operations are additionally depicted. FIG. 6 demonstrates the effect of the position adjustment loop 40 on the speed control loop 50. The desired position metric, Pos_Ticks_Cmd, is preferably set at half of the desired speed metric, Speed_Ticks_Cmd, although the present invention is not so limited. The Pos_Ticks_Cmd value is compared to the actual count Pos_Ticks_Actual at block 56, to generate the position error term Pos_Ticks_Error. Pos_Ticks_Error is also preferably limited at block 52 to +/− half the value of Speed_Ticks_Cmd, to provide robustness against noise and other sources of measurement error. The position error is then processed by the position adjustment loop PID controller 58 to produce Speed_Ticks_Adjust, a value by which to adjust the speed of the motor 20 to eliminate position error.

In the speed control loop 40, the desired speed metric Speed_Ticks_Cmd 42 is compared to the actual count Speed_Ticks_Actual, and additionally adjusted by the Speed_Ticks_Adjust value from the position adjustment loop 40. The result is preferably limited at block 78 to a 16-bit digital value. In combination with 8-bit PID gains, this keeps the arithmetic within 32-bit computations, minimizing the complexity of a digital implementation of the present invention. The thus-limited Speed_Ticks_Error is an input to the speed control loop PID controller 48, which generates PWM data 14 to drive the motor 20.

From FIG. 6, the control equations for the entire system are thus:

$$Pos\_Ticks\_Error_k = Pos\_Ticks\_Cmd - Pos\_Ticks\_Actual_k;$$

$$Speed\_Ticks\_Error_k = Speed\_Ticks\_Actual_k - Speed\_Ticks\_Cmd - Speed\_Ticks\_Adjust_k$$

In one embodiment, for a desired speed of 2500 rpm, the preferred PID controller gains for the speed and position PID controllers are:

| | | | |
|---|---|---|---|
| Speed: | $K_{ps} = 6.530$ | $K_{is} = 0.597$ | $K_{ds} = 0.000$ |
| Position: | $K_{pp} = 0.023$ | $K_{ip} = 0.000$ | $K_{dp} = 0.000$ |

Figure 7:
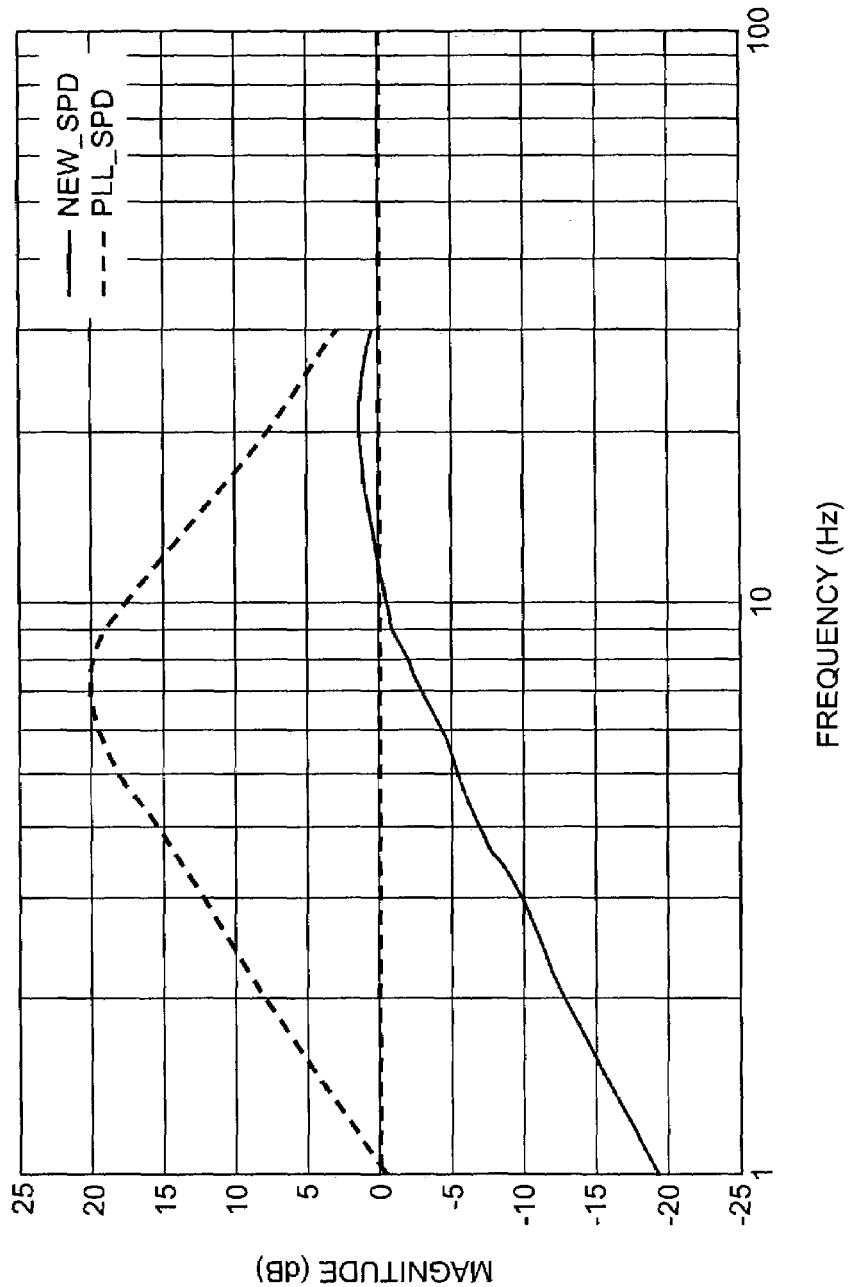
FIG. 7 is a graph of speed response to load inputs.
Figure 8:
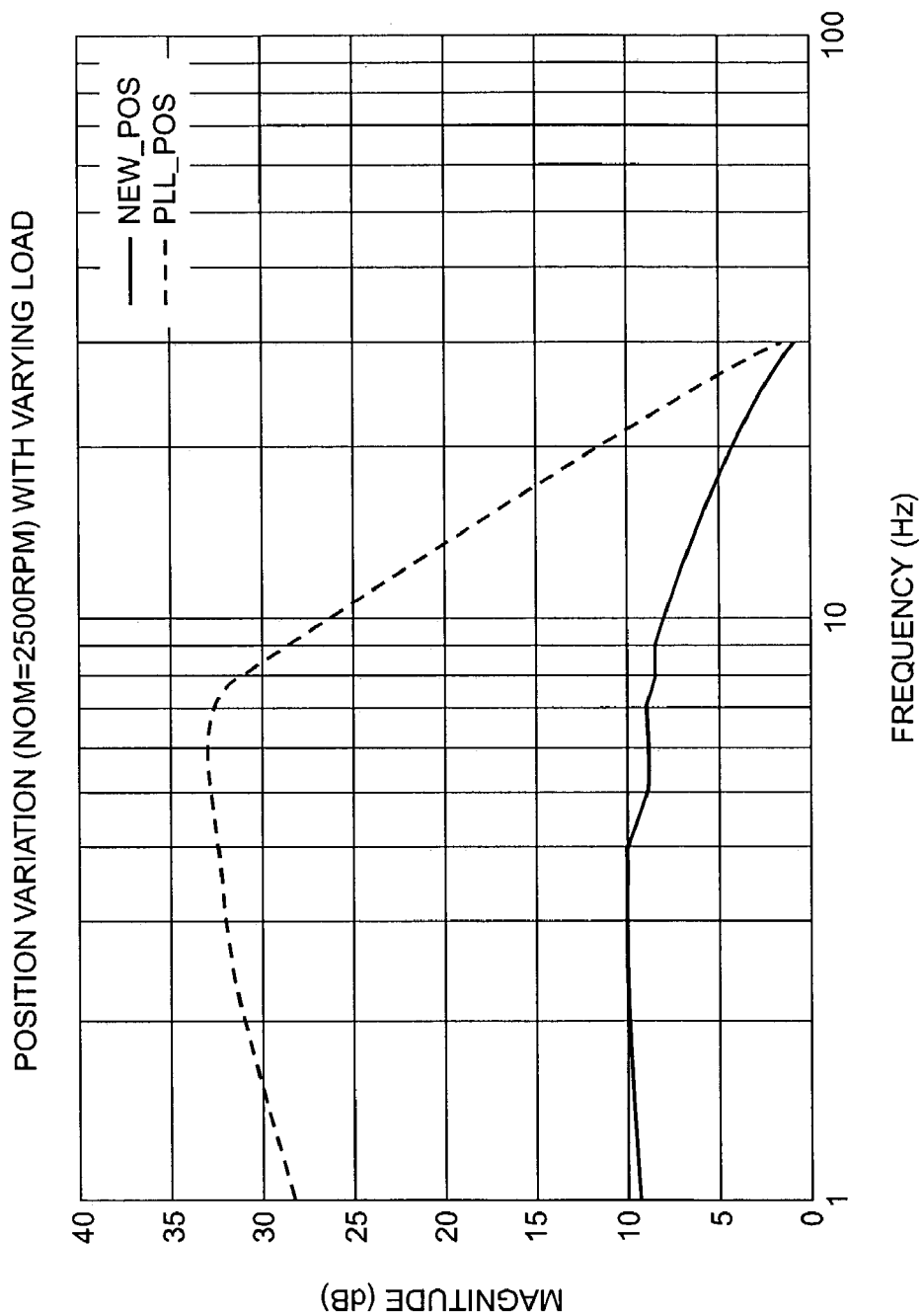
FIG. 8 is a graph of position response to load inputs.

The present invention greatly improves the transient response of the motor 20. FIGS. 7 and 8 are graphs of speed and position responses, respectively, to varying load inputs of a motor 20 controlled by the present invention, and a traditional PLL loop controller.

The present invention provides for precise speed and position control for motors, under conditions of non-predictable load variations, where prior art controllers perform poorly. By separating speed and position control into separate control loops, prior art problems of the speed control locking onto harmonics of the commanded speed are avoided. Since the PID controllers can be optimized at each discrete speed point, the motor controller 12 can support a wide dynamic speed range. Additionally, the entire controller 12 can be designed into a digital device, such as an ASIC, FPGA, or the like, thus eliminating the need for a separate motor controller chip, reducing system costs, and increasing reliability. The elimination of non-linear analog components also renders the control method of the present invention amenable to modeling for stability analysis and gain prediction, using well-known tools such as root locus or Bode.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A printer, comprising:
a motor having an encoder operatively coupled thereto, said encoder generating a pulse train indicative of the speed of said motor;
a clock generating a periodic clock signal at a frequency greater than said pulse train, the clock signal frequency independent of the speed of said motor;
a motor speed counter indicating the instantaneous speed of said motor by counting the number of clock signal cycles per cycle of said pulse train;
a command position counter generating a command position signal defining a plurality of sampling points, the sampling points independent of the speed of said motor; and
a controller receiving said pulse train, said periodic clock signal, said motor speed indication, and said command position signal and implementing first and second control loops,
said first control loop operative to adjust the speed of said motor so as to receive a predetermined number of cycles of said periodic clock signal per cycle of said pulse train, and
said second loop operative to adjust the speed of said motor so as to receive a predetermined number of cycles of said periodic clock signal between a sampling point of said command position signal and a transition of said pulse train.

2. The printer of claim 1 wherein said controller adjusts the speed of said motor by generating pulse width modulation data.

3. The printer of claim 2 further comprising a power driver connected to said controller and receiving said pulse width modulation data, and additionally connected to said motor and operative to drive voltages to phases of said motor in response to said pulse width modulation data.

4. The printer of claim 1 wherein said controller includes at least one proportional, integral, derivative (PID) controller.

5. The printer of claim 1 wherein said clock, said motor speed counter, said command position counter, and said controller are co-located on an integrated circuit.

6. A method of controlling the speed and position of a motor, comprising:
receiving a pulse train indicative of the speed of said motor;
receiving a periodic clock signal at a frequency greater than said pulse train, the clock signal frequency independent of the speed of said motor;
adjusting the speed of said motor so as to receive a predetermined number of cycles of said periodic clock signal per cycle of said pulse train, to effect speed control;
generating a command position signal defining a plurality of sampling points, the sampling points independent of the speed of said motor; and
further adjusting the speed of said motor so as to receive a predetermined number of cycles of said periodic clock signal between a sampling point of said command position signal and a transition of said pulse train, to effect position control.

7. The method of claim 6 wherein said pulse train is generated by an encoder operatively coupled to the shaft of said motor.

8. The method of claim 7 wherein each pulse in said pulse train corresponds to a rotation of said shaft through a predetermined angular distance.

9. The method of claim 6 wherein the frequency of said periodic signal exceeds the frequency of said pulse train by at least the Nyquist criteria.

10. The method of claim 9 wherein the frequency of said periodic signal exceeds the frequency of said pulse train by at least one order of magnitude.

11. The method of claim 6, wherein said predetermined number of cycles of said periodic signal between a sampling point of said command position signal and a transition of said pulse train is about half of said predetermined number of cycles of said periodic signal per cycle of said pulse train.

12. The method of claim 6 wherein the speed of said motor is adjusted for said speed control in a primary control loop that outputs Pulse Width Modulation (PWM) data to drive said motor.

13. The method of claim 12 wherein said primary control loop includes a proportional, integral, derivative (PID) controller.

14. The method of claim 12 wherein the speed of said motor is adjusted for said position control in a secondary control loop that outputs a speed adjustment signal that is an input to said primary control loop.

15. The method of claim 14 wherein said secondary control loop includes a PID controller.

16. The method of claim 15 wherein, for each said primary and secondary control loops, the loop control equations are:

Int_Output=$K_i$×Error$_k$+Int_Value, where $$\text{Int\_Value} = \sum_{n=1}^{k-1} K_i \times Error_n;$$

Deriv_Output=$K_d$×Error$_k$−Deriv_Value, where

Deriv_Value=$k_d$×Error$_{k-1}$; and

Output$_k$=$K_p$×Error$_k$+Int_Output+Deriv_Output;

where k denotes a present sampling value and k−1 denotes a previous sampling value, and wherein:

Error=respective difference between the number of cycles of said periodic signal received and said respective predetermined number of cycles of said periodic signal, Output=said PWM data for said primary control loop and said speed adjustment signal for said secondary control loop, and $K_p$, $K_i$, and $K_d$ are the proportional, integral and derivatives gains, respectively.

17. The method of claim 16 wherein the values Int_Output and Der_Output are limited between predetermined minimum and maximum values.

18. The method of claim 16 wherein the value Output is limited between predetermined minimum and maximum values.

* * * * *